US011866539B2

United States Patent
Huang et al.

(10) Patent No.: US 11,866,539 B2
(45) Date of Patent: Jan. 9, 2024

(54) PROCESS FOR PREPARING AN ULTRA-HIGH MOLECULAR WEIGHT POLYMER VIA EMULSION POLYMERIZATION AT ROOM TEMPERATURE

(71) Applicant: Changzhou University, Suzhou (CN)

(72) Inventors: Wenyan Huang, Jiangsu (CN); Bibiao Jiang, Jiangsu (CN); Xiaoqiang Xue, Jiangsu (CN); Hongjun Yang, Jiangsu (CN); Qimin Jiang, Jiangsu (CN)

(73) Assignee: Changzhou University, Jiangsu (CN)

( * ) Notice: Subject to any disclaimer, the term of this patent is extended or adjusted under 35 U.S.C. 154(b) by 0 days.

(21) Appl. No.: 17/188,760

(22) Filed: Mar. 1, 2021

(65) Prior Publication Data
US 2021/0189047 A1     Jun. 24, 2021

Related U.S. Application Data

(63) Continuation of application No. 15/742,407, filed on Jan. 5, 2018, which is a continuation of application No. PCT/CN2017/081177, filed on Apr. 20, 2017.

(30) Foreign Application Priority Data

Dec. 30, 2016  (CN) .......................... 201611258844.1
Dec. 30, 2016  (CN) .......................... 201611258871.9
Dec. 30, 2016  (CN) .......................... 201611263551.2

(51) Int. Cl.
*C08F 2/26*       (2006.01)
*C08F 18/08*      (2006.01)
(Continued)

(52) U.S. Cl.
CPC ............ *C08F 293/005* (2013.01); *C08F 2/26* (2013.01); *C08F 18/08* (2013.01); *C08F 112/08* (2013.01);
(Continued)

(58) Field of Classification Search
None
See application file for complete search history.

(56) References Cited

U.S. PATENT DOCUMENTS 5,444,140 A  *  8/1995 Paine .................... C08F 2/00
                                          430/137.17

FOREIGN PATENT DOCUMENTS

CN    101891858 A    11/2010
CN    102786613 A    11/2012
(Continued)

OTHER PUBLICATIONS

Wutzel, H. et al., "Exploring the Limits of Emulsion Polymerization of Styrene for the Synthesis of Polymer Nanoparticles". Monatshefte für Chemie—Chemical Monthly. Apr. 2007, 138, 357-361. (Year: 2007).*

(Continued)

*Primary Examiner* — Richard A Huhn
(74) *Attorney, Agent, or Firm* — Greenberg Traurig, LLP

(57) ABSTRACT

A process for preparing an ultra-high molecular weight polymer via emulsion polymerization at the room/indoor temperature includes using persulfate as initiator, water as medium, anionic surfactant as emulsifier, sodium bicarbonate as pH regulator, styrene, (meth) acrylate or vinyl acetate as monomer, which is subjected to a free radical polymerization at room temperature and the normal pressure. The ultra-high molecular weight polymers may have weight average molecular weights larger than 1,000,000 g/mol. The monomer conversion may be above 85% after reacting for 1~6 hours. The process may be carried out at room temperature and normal pressure without the addition of other assist initiators. There temperature and pressure of the
(Continued)

reaction may not be controlled, and the molecular weight and molecular weight distribution may be adjusted and controlled in a wider range.

3 Claims, 2 Drawing Sheets

(51) Int. Cl.
    *C08F 20/18*     (2006.01)
    *C08F 293/00*     (2006.01)
    *C08F 118/08*     (2006.01)
    *C08F 112/08*     (2006.01)
    *C08F 120/14*     (2006.01)
    *C08F 120/18*     (2006.01)
    *C08F 20/14*     (2006.01)

(52) U.S. Cl.
    CPC .......... *C08F 118/08* (2013.01); *C08F 120/14* (2013.01); *C08F 120/18* (2013.01); *C08F 20/14* (2013.01); *C08F 2438/02* (2013.01)

(56) References Cited

FOREIGN PATENT DOCUMENTS

| CN | 102911310 A | | 2/2013 |
|---|---|---|---|
| CN | 102924640 A | * | 2/2013 |
| CN | 102924640 A | | 2/2013 |

OTHER PUBLICATIONS

Matyjaszewski, K. et al. Handbook of Radical Polymerization. Ch. 3. John Wiley and Sons, Inc., Hoboken, NJ. 2002. (Year: 2002).*
Tauer, K. et al., "Interfacial Energy Promotes Radical Heterophase Polymerization". Macromolecules 2004, 37(16), 5880-5888. (Year: 2004).*
Capek, I. et al., "Effect of Temperature on Styrene Emulsion Polymerization in the Presence of Sodium Dodecyl Sulfate. II", J. Polym. Sci. Part A: Polym. Chem. 2000, 38, 1477-1486.
Guo et al., "Calculation of hydrophile-lipophile balance for polyethoxylated surfactants by group contribution method," J. Colloid Interf. Sci. 298 (2006) 441-450.
Moroi, "Micelle Temperature Range (MTR or Krafft Point), " Micelles (1992) 113-129.
Pan, Polymer Chemistry (2007) pp. 86-87,164.
Watanabe et al., "Surfactant effects on hydrate formulation in an unstirred gas/liquid system: An experimental study using HFC-32 and sodium dodecyl sulfate, " Chem. Eng. Sci. 60 (2005) 41-450.
Wutzel, H. et al., "Exploring the Limits of Emulsion Polymerization of Styrene for the Synthesis of Polymer Nanoparticles", Monatshefte für Chemie—Chemical Monthly, Apr. 2007, 138, 357-361 (2007).
Sarkar, S. et al., "Thermal Decomposition of Potassium Persulfate in Aqueous Solution at 50°C in an Inert Atmosphere of Nitrogen in the Presence of Acrylonitrile Monomer," J. App. Polym. Sci. 1988, 35, 1441-1458 (1988).

* cited by examiner

PROCESS FOR PREPARING AN ULTRA-HIGH MOLECULAR WEIGHT POLYMER VIA EMULSION POLYMERIZATION AT ROOM TEMPERATURE

CROSS REFERENCE TO RELATED APPLICATIONS

This application is a continuation of and claims priority to U.S. patent application Ser. No. 15/742,407, filed on Jan. 5, 2018, which is a 371 U.S. National Stage of International Application No. PCT/CN2017/081177, filed Apr. 20, 2017, which claims the benefit of the earlier filing date of Chinese Patent Application No. 201611258871.9, filed on Dec. 30, 2016, Chinese Patent Application No. 201611263551.2, filed on Dec. 30, 2016, and Chinese Patent Application No. 201611258844.1, filed on Dec. 30, 2016, which are each incorporated herein by reference in their entirety.

FIELD OF THE DISCLOSURE

This invention is about a process for preparing an ultra-high molecular weight polymer via emulsion polymerization at room temperature, belonging to the fields of polymer synthesis and preparation of functional polymers.

BACKGROUND OF RELATED ART

Commercially, polystyrene, polymethyl methacrylate (PMMA) and polyvinyl acetate are the common thermoplastic polymers. But their applications have been greatly limited because of their low impact-resistance strength, low heat resistance and so on. In recent years, some properties of polymers are improved by increasing their molecular weight, among them, the research of the polymers with ultra-high molecular weight is one of the hot directions. Ultra-high molecular weight polymers retain the excellent optical properties, processable properties, and also improve the mechanical strength and heat resistance properties. Therefore, it is significant to develop and enrich the synthesis methods of polymers with ultra-high molecular weight.

At present, the preparation of ultra-high molecular weight polystyrene is mainly uses the compound of multi substituted bibenzyl (C—C bond compound) as initiator to initiate styrene in bulk polymerization; uses the rare earth catalyst or complex catalyst formed by calixarene neodymium, Mg(n-Bu)2 and HMPA polymerizes via coordination polymerization under high pressure; uses azo compounds as initiator and organic tellurium as a chain transfer agent via soap free emulsion polymerization. PMMA with ultra-high molecular weight is prepared generally by suspension polymerization, low temperature plasma polymerization and coordination polymerization. The initiating system is complex, the initiating efficiency is low and more impurities are introduced into the product. Suspension polymerization requires a large amount of water as a continuous phase, and the production efficiency is low. There are dispersants, stabilizers and other residual impurities in the prepared polymer products. Low temperature plasma polymerization method requires high-level equipment and the polymer solubility and the properties of toughness and impact resistance of these polymers would decrease owing to the wide molecular weight distribution and the cross-linking reaction occurring. The coordination polymerization system is complex and requires harsh conditions, which are difficult to be conducted. These polymerization systems are complex. High-level technology and equipment are required in the processing. The cost of polymerization is high. Achievement of high conversion rate of monomer requires a long time for polymerization. The molecular weight of the polymer is affected by various factors. These deficiencies described as above limit the development of large-scale applications for polymers with ultra-high molecular weight. Polyvinyl acetate generally is only obtained by free radical polymerization. It cannot be polymerized by anionic polymerization because of the electron withdrawing group on vinyl acetate monomer, it is also because free radical activity of vinyl acetate is too high, the chain transfer constant is too large, which make it difficult to obtain polyvinyl acetate with high molecular weight by bulk and solution polymerization. At present, poly vinyl acetate was prepared via conventional free radical emulsion polymerization, using non-ionic emulsifiers, polyvinyl alcohol (PVA) as the dispersing agent at 60-90° C., the polymerization has high energy consumption, and it is easy to cause active chain transfer, which results in low molecular weight of the polymer prepared. Using redox initiator, the polymer with relatively high molecular weight can be prepared at relatively low temperature, but the reaction system is complex. The reaction system and polymer properties are limited by ratio of reducing agent and oxidant and these problems also limit the development for large scale applications of polyvinyl acetate. The above polymerization described hinders the development of the theoretical research and scaled applications of ultra-high molecular weight polymers.

SUMMARY

This invention is to provide a method for preparation of polymer with ultra-high molecular weight via free radical emulsion polymerization at room temperature. The process of ultra-high molecular weight polymers used potassium persulfate and ammonium persulfate as initiators via emulsion polymerization at room temperature. The polymerization system is simple and stable, easy to be operated, short reaction time and high monomer conversion, high molecular weight for the polymer and narrow molecular weight distribution. The molecular weight of the polymer could be controlled and adjusted according to polymerization conditions.

A process for preparing an ultra-high molecular weight polymer via emulsion polymerization at room temperature used persulfate as initiator, water as the medium, anionic surfactant as emulsifier, sodium bicarbonate as pH regulator, styrene, vinyl acetate or (meth) acrylate as monomer to polymerize by free radical emulsion. The key novelty of this invention is the use of a commercial potassium persulfate and ammonium persulfate, which can be used to initiate the styrene, vinyl acetate or (meth) acrylate at room temperature under conditional free radical emulsion polymerization without addition of other high active assist initiators or increasing the reaction temperature. The ultra-high molecular weight polymers were successfully obtained, whose weight average molecular weight of the polymers were larger than 1,000,000 g/mol. This synthesizing process to prepare ultra-high molecular weight polymers is simple and practical, and can be achieved at low production cost.

In the preferred technical process, the initiator is potassium persulfate or ammonium persulfate.

In the preferred technical process, the molar ratio of initiator and monomer is 1~5:100.

In the preferred technological process, the mass ratio of water and monomer is 2~5:1.

In the preferred technological process, the polymerization temperature is room temperature and the polymerization reaction time is controlled in a range of 1~6 hours.

In the preferred technological process, the polymerization method is emulsion polymerization, and the polymerization mechanism is free radical polymerization.

In the preferred technological process, the surfactant is an anionic surfactant, sodium dodecyl benzene sulfonate or sodium dodecyl sulfate.

In the preferred technical process, the mass ratio of the surfactant and monomer is 4-6 wt %.

In the preferred technical process, the mass ratio of the pH modifier sodium bicarbonate and monomer is 2~4 wt %. The pH value is adjusted to 7~8, which ensures the stability of polymerization system.

In this invention, the persulfate was used as initiator, which can initiate styrene, vinyl acetate, or (meth) acrylate to be polymerized via emulsion polymerization at room temperature. The polymers with ultra-high molecular weight were obtained. In the emulsion polymerization, only water was used as the reaction medium, which is safe and reliable for the environment, meanwhile the production of ultra-high molecular weight polymers not only saves the cost, but also have no effect on the environment. Selecting the appropriate emulsion polymerization conditions, persulfate can be decomposed at room temperature and normal pressure, then can initiate styrene, vinyl acetate or (meth) acrylate to be polymerized. In this polymerization, high polymerization rate, short reaction time and high monomer conversion, ultra-high molecular weight and narrow molecular weight distribution are the outstanding characters. Furthermore, the molecular weight and molecular weight distribution of the polymers can be adjusted according to the polymerization conditions. The reaction system is simple and stable under the mild conditions, which is also easy to be operated, suitable for large-scale application.

Compared with the present technology, the creativity and novelty of this invention is described as follows: firstly, in this invention, the use of the commercialized initiator greatly reduces the polymerization cost; the reaction system is simple and stable, be operated under mild reaction conditions, without temperature control, less impact on the environment, low energy consumption, which is suitable for large-scale industrialized production.

Secondly, in this invention, reaction time is short and monomer conversion rate is high, the molecular weight of the polymer is ultra-high and the distribution of molecular weight is narrow and the molecular weight and molecular weight distribution can be adjusted in a wide range, which is conducive to the precise control of the preparation of polymer with ultra-high molecular weight for meeting different requirements. It is significant for the theoretical study of the synthesis process of polymers with ultra-high molecular weight.

DETAILED DESCRIPTION

Embodiment 1

Figure 1:
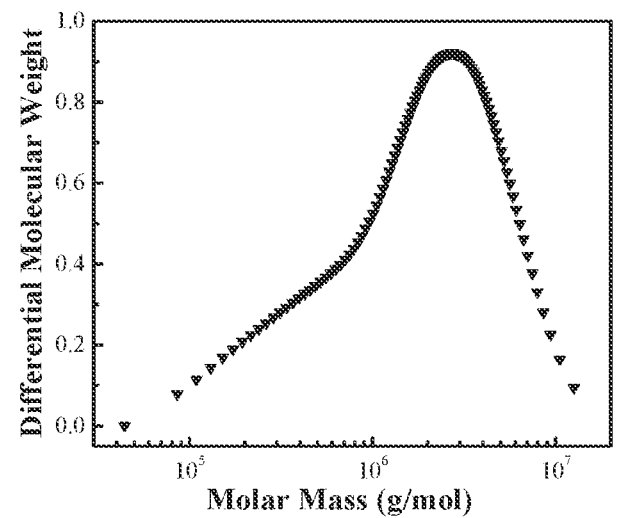
FIG. 1 is the differential molecular weight distribution curve of polystyrene with ultra-high molecular weight obtained from embodiment 1.

Add styrene (5.0002 g, 0.0480 mol) to the reaction flask of the solution of sodium dodecyl sulfate (0.2500 g, 5 wt % styrene), sodium bicarbonate (0.1500 g, 3 wt % styrene), potassium persulfate (0.4321 g, 0.0016 mol) and water (20.0053 g, 400 wt % styrene), stirring uniformly. The flask was vacuumized and exhausted oxygen, then put into water bath at 35° C. to react for 4 hours. The styrene conversion rate was found to be 90.27%. The emulsion is demulsified by ethanol and the precipitate was dried after three times of washing, then dried after three times purification to obtain polymer. The changes of molecular weight and its distribution of the polymers were analyzed using triple detection size exclusion chromatography. The results are obtained: light scattering weight-average molecular weight Mw.MALLS=2693000 g/mol, molecular weight distribution PDI=3.60. FIG. 1 is the differential molecular weight distribution curve of polystyrene with ultra-high molecular weight obtained from embodiment 1.

Embodiment 2

Add styrene (5.0002 g, 0.0480 mol) to the reaction flask of the solution of sodium dodecyl sulfate (0.3003 g, 6 wt % styrene), sodium bicarbonate (0.2001 g, 4 wt % styrene), ammonium persulfate (0.5472 g, 0.0024 mol) and water (25.0005 g, 500 wt % styrene), stirring uniformly. The flask was vacuumized and exhausted oxygen, then put into water bath at 35° C. to react for 1 hours. The styrene conversion rate was found to be 89.77%. The emulsion is demulsified by ethanol and the precipitate was dried after three times of washing, then dried after three times purification to obtain polymer. The changes of molecular weight and its distribution of the polymers were analyzed using triple detection size exclusion chromatography. The results are obtained: light scattering weight-average molecular weight Mw.MALLS=3730000 g/mol, molecular weight distribution PDI=2.07.

Embodiment 3

Add styrene (5.0002 g, 0.0480 mol) to the reaction flask of the solution of sodium dodecyl sulfate (0.2003 g, 4 wt % styrene), sodium bicarbonate (0.1002 g, 2 wt % styrene), potassium persulfate (0.1309 g, 0.0005 mol) and water (10.0006 g, 200 wt % styrene), stirring uniformly. The flask was vacuumized and exhausted oxygen, then put into water bath at 35° C. to react for 6 hours. The styrene conversion rate was found to be 88.65%. The emulsion is demulsified by ethanol and the precipitate was dried after three times of washing, then dried after three times purification to obtain polymer. The changes of molecular weight and its distribution of the polymers were analyzed using triple detection size exclusion chromatography. The results are obtained: light scattering weight-average molecular weight Mw.MALLS=5847000 g/mol, molecular weight distribution PDI=2.06.

Embodiment 4

Add styrene (5.0001 g, 0.0480 mol) to the reaction flask of the solution of sodium dodecyl sulfate (0.2502 g, 5 wt % styrene), sodium bicarbonate (0.1500 g, 3 wt % styrene), potassium persulfate (0.4322 g, 0.0016 mol) and water (20.0007 g, 400 wt % styrene), stirring uniformly. The flask was vacuumized and exhausted oxygen, then put into water bath at 25° C. to react for 4 hours. The styrene conversion rate was found to be 88.97%. The emulsion is demulsified by ethanol and the precipitate was dried after three times of washing, then dried after three times purification to obtain polymer. The changes of molecular weight and its distribution of the polymers were analyzed using triple detection size exclusion chromatography. The results are obtained: light scattering weight-average molecular weight Mw.MALLS=5502000 g/mol, molecular weight distribution PDI=2.25.

Embodiment 5

Add styrene (5.0001 g, 0.0480 mol) to the reaction flask of the solution of sodium dodecyl sulfate (0.2500 g, 5 wt % styrene), sodium bicarbonate (0.1500 g, 3 wt % styrene), potassium persulfate (0.3242 g, 0.0012 mol) and water (20.0053 g, 400 wt % styrene), stirring uniformly. The flask was vacuumized and exhausted oxygen, then put into water bath at 35° C. to react for 6 hours. The styrene conversion rate was found to be 92.74%. The emulsion is demulsified by ethanol and the precipitate was dried after three times of washing, then dried after three times purification to obtain polymer. The changes of molecular weight and its distribution of the polymers were analyzed using triple detection size exclusion chromatography. The results are obtained: light scattering weight-average molecular weight Mw.MALLS=3558000 g/mol, molecular weight distribution PDI=4.20.

Embodiment 6

Add styrene (5.0002 g, 0.0480 mol) to the reaction flask of the solution of sodium dodecyl benzene sulfonate (0.3000 g, 6 wt % styrene), sodium bicarbonate (0.1500 g, 3 wt % styrene), potassium persulfate (0.4321 g, 0.0016 mol) and water (20.0053 g, 400 wt % styrene), stirring uniformly. The flask was vacuumized and exhausted oxygen, then put into water bath at 25° C. to react for 4 hours. The styrene conversion rate was found to be 91.54%. The emulsion is demulsified by ethanol and the precipitate was dried after three times of washing, then dried after three times purification to obtain polymer. The changes of molecular weight and its distribution of the polymers were analyzed using triple detection size exclusion chromatography. The results are obtained: light scattering weight-average molecular weight Mw.MALLS=4331000 g/mol, molecular weight distribution PDI=2.40.

Embodiment 7

Figure 2:
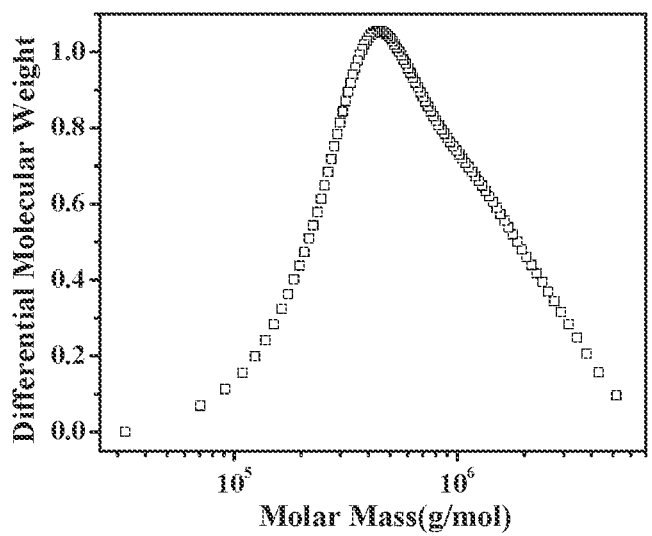
FIG. 2 is the differential molecular weight distribution curve of PMMA with ultra-high molecular weight obtained from embodiment 7.

Add methyl methacrylate (MMA) (5.0002 g, 0.0500 mol) to the reaction flask of the solution of sodium dodecyl sulfate (0.2501 g, 5 wt % MMA), sodium bicarbonate (0.1500 g, 3 wt % MMA), potassium persulfate (0.4591 g, 0.0017 mol) and water (20.0042 g, 400 wt % MMA), stirring uniformly. The flask was vacuumized and exhausted oxygen, then put into water bath at 35° C. to react for 4 hours. The MMA conversion rate was found to be 95.00%. The emulsion is demulsified by ethanol and the precipitate was dried after three times of washing, then dried after three times purification to obtain polymer. The changes of molecular weight and its distribution of the polymers were analyzed using triple detection size exclusion chromatography. The results are obtained: light scattering weight-average molecular weight Mw.MALLS=3315000 g/mol, molecular weight distribution PDI=2.39. FIG. 2 is the differential molecular weight distribution curve of PMMA with ultra-high molecular weight obtained from embodiment 7.

Embodiment 8

Add MMA (5.0002 g, 0.0500 mol) to the reaction flask of the solution of sodium dodecyl sulfate (0.3001 g, 6 wt % MMA), sodium bicarbonate (0.2000 g, 4 wt % MMA), ammonium persulfate (0.5712 g, 0.0025 mol) and water (25.0005 g, 500 wt % MMA), stirring uniformly. The flask was vacuumized and exhausted oxygen, then put into water bath at 35° C. to react for 4 hours. The MMA conversion rate was found to be 90.97%. The emulsion is demulsified by ethanol and the precipitate was dried after three times of washing, then dried after three times purification to obtain polymer. The changes of molecular weight and its distribution of the polymers were analyzed using triple detection size exclusion chromatography. The results are obtained: light scattering weight-average molecular weight Mw.MALLS=3023000 g/mol, molecular weight distribution PDI=3.13.

Embodiment 9

Add MMA (5.0002 g, 0.0500 mol) to the reaction flask of the solution of sodium dodecyl sulfate (0.2003 g, 4 wt % MMA), sodium bicarbonate (0.1002 g, 2 wt % MMA), potassium persulfate (0.1308 g, 0.0005 mol) and water (10.0006 g, 200 wt % MMA), stirring uniformly. The flask was vacuumized and exhausted oxygen, then put into water bath at 35° C. to react for 6 hours. The MMA conversion rate was found to be 93.65%. The emulsion is demulsified by ethanol and the precipitate was dried after three times of washing, then dried after three times purification to obtain polymer. The changes of molecular weight and its distribution of the polymers were analyzed using triple detection size exclusion chromatography. The results are obtained: light scattering weight-average molecular weight Mw.MALLS=6082300 g/mol, molecular weight distribution PDI=2.46.

Embodiment 10

Add MMA (5.0001 g, 0.0500 mol) to the reaction flask of the solution of sodium dodecyl sulfate (0.2502 g, 5 wt % MMA), sodium bicarbonate (0.1500 g, 3 wt % MMA), potassium persulfate (0.4592 g, 0.0017 mol) and water (20.0001 g, 400 wt % MMA), stirring uniformly. The flask was vacuumized and exhausted oxygen, then put into water bath at 25° C. to react for 4 hours. The MMA conversion rate was found to be 95.05%. The emulsion is demulsified by ethanol and the precipitate was dried after three times of washing, then dried after three times purification to obtain polymer. The changes of molecular weight and its distribution of the polymers were analyzed using triple detection size exclusion chromatography. The results are obtained: light scattering weight-average molecular weight Mw.MALLS=5987000 g/mol, molecular weight distribution PDI=2.76.

Embodiment 11

Add MMA (5.0001 g, 0.0500 mol) to the reaction flask of the solution of sodium dodecyl sulfate (0.2502 g, 5 wt % MMA), sodium bicarbonate (0.1500 g, 3 wt % MMA), potassium persulfate (0.3375 g, 0.0013 mol) and water (20.0053 g, 400 wt % MMA), stirring uniformly. The flask was vacuumized and exhausted oxygen, then put into water bath at 35° C. to react for 6 hours. The MMA conversion rate was found to be 98.21%. The emulsion is demulsified by ethanol and the precipitate was dried after three times of washing, then dried after three times purification to obtain polymer. The changes of molecular weight and its distribution of the polymers were analyzed using triple detection size exclusion chromatography. The results are obtained: light scattering weight-average molecular weight Mw.MALLS=6380000 g/mol, molecular weight distribution PDI=2.97.

Embodiment 12

Add n-butyl methacrylate (n-BMA) (5.0000 g, 0.0352 mol) to the reaction flask of the solution of sodium dodecyl benzene sulfonate (0.3000 g, 6 wt % n-BMA), sodium bicarbonate (0.1500 g, 3 wt % n-BMA), potassium persulfate (0.3171 g, 0.0012 mol) and water (20.0003 g, 400 wt % n-BMA), stirring uniformly. The flask was vacuumized and exhausted oxygen, then put into water bath at 35° C. to react for 4 hours. The n-BMA conversion rate was found to be 94.06%. The emulsion is demulsified by ethanol and the precipitate was dried after three times of washing, then dried after three times purification to obtain polymer. The changes of molecular weight and its distribution of the polymers were analyzed using triple detection size exclusion chromatography. The results are obtained: light scattering weight-average molecular weight Mw.MALLS=3291000 g/mol, molecular weight distribution PDI=2.76.

Embodiment 13

Figure 3:
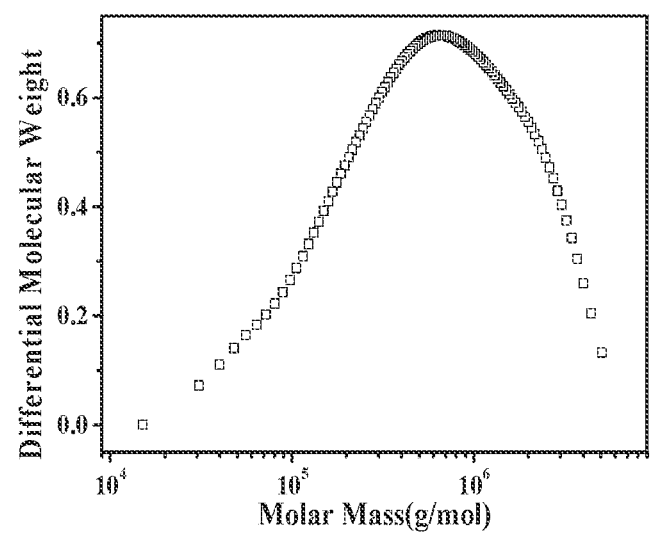
FIG. 3 is the differential molecular weight distribution curve of PVAc with ultra-high molecular weight obtained from embodiment 13.

Add vinyl acetate (VAc) (5.0002 g, 0.0582 mol) to the reaction flask of the solution of sodium dodecyl sulfate (0.2502 g, 5 wt % VAc), sodium bicarbonate (0.1501 g, 3 wt % VAc), potassium persulfate (0.6211 g, 0.0023 mol) and water (20.0008 g, 400 wt % VAc), stirring uniformly. The flask was vacuumized and exhausted oxygen, then put into water bath at 35° C. to react for 4 hours. The VAc conversion rate was found to be 87.88%. The emulsion is demulsified by ethanol and the precipitate was dried after three times of washing, then dried after three times purification to obtain polymer. The changes of molecular weight and its distribution of the polymers were analyzed using triple detection size exclusion chromatography. The results are obtained: light scattering weight-average molecular weight Mw.MALLS=1022300 g/mol, molecular weight distribution PDI=3.96. FIG. 3 is the differential molecular weight distribution curve of PVAc with ultra-high molecular weight obtained from embodiment 13.

Embodiment 14

Add VAc (5.0000 g, 0.0581 mol) to the reaction flask of the solution of sodium dodecyl sulfate (0.3003 g, 6 wt % VAc), sodium bicarbonate (0.2001 g, 4 wt % VAc), ammonium persulfate (0.6612 g, 0.0029 mol) and water (25.0009 g, 500 wt % VAc), stirring uniformly. The flask was vacuumized and exhausted oxygen, then put into water bath at 35° C. to react for 1 hours. The VAc conversion rate was found to be 90.71%. The emulsion is demulsified by ethanol and the precipitate was dried after three times of washing, then dried after three times purification to obtain polymer. The changes of molecular weight and its distribution of the polymers were analyzed using triple detection size exclusion chromatography. The results are obtained: light scattering weight-average molecular weight Mw.MALLS=1001300 g/mol, molecular weight distribution PDI=2.87.

Embodiment 15

Add VAc (5.0003 g, 0.0582 mol) to the reaction flask of the solution of sodium dodecyl sulfate (0.2003 g, 4 wt % VAc), sodium bicarbonate (0.2002 g, 4 wt % VAc), potassium persulfate (0.1566 g, 0.0006 mol) and water (10.0026 g, 200 wt % VAc), stirring uniformly. The flask was vacuumized and exhausted oxygen, then put into water bath at 35° C. to react for 6 hours. The VAc conversion rate was found to be 90.45%. The emulsion is demulsified by ethanol and the precipitate was dried after three times of washing, then dried after three times purification to obtain polymer. The changes of molecular weight and its distribution of the polymers were analyzed using triple detection size exclusion chromatography. The results are obtained: light scattering weight-average molecular weight Mw.MALLS=2744000 g/mol, molecular weight distribution PDI=3.16.

Embodiment 16

Add VAc (5.0001 g, 0.0581 mol) to the reaction flask of the solution of sodium dodecyl sulfate (0.2502 g, 5 wt % VAc), sodium bicarbonate (0.1500 g, 3 wt % VAc), potassium persulfate (0.5224 g, 0.0019 mol) and water (20.0018 g, 400 wt % VAc), stirring uniformly. The flask was vacuumized and exhausted oxygen, then put into water bath at 25° C. to react for 4 hours. The VAc conversion rate was found to be 85.06%. The emulsion is demulsified by ethanol and the precipitate was dried after three times of washing, then dried after three times purification to obtain polymer. The changes of molecular weight and its distribution of the polymers were analyzed using triple detection size exclusion chromatography. The results are obtained: light scattering weight-average molecular weight Mw.MALLS=1313000 g/mol, molecular weight distribution PDI=3.34.

Embodiment 17

Add VAc (5.0001 g, 0.0581 mol) to the reaction flask of the solution of sodium dodecyl sulfate (0.2500 g, 5 wt % VAc), sodium bicarbonate (0.1500 g, 3 wt % VAc), potassium persulfate (0.3923 g, 0.0015 mol) and water (20.0012 g, 400 wt % VAc), stirring uniformly. The flask was vacuumized and exhausted oxygen, then put into water bath at 35° C. to react for 6 hours. The VAc conversion rate was found to be 93.15%. The emulsion is demulsified by ethanol and the precipitate was dried after three times of washing, then dried after three times purification to obtain polymer. The changes of molecular weight and its distribution of the polymers were analyzed using triple detection size exclusion chromatography. The results are obtained: light scattering weight-average molecular weight Mw.MALLS=1776000 g/mol, molecular weight distribution PDI=3.13.

Embodiment 18

Add VAc (5.0002 g, 0.0582 mol) to the reaction flask of the solution of sodium dodecyl sulfate (0.3002 g, 6 wt % VAc), sodium bicarbonate (0.1503 g, 3 wt % VAc), potassium persulfate (0.5235 g, 0.0019 mol) and water (20.0006 g, 400 wt % VAc), stirring uniformly. The flask was vacuumized and exhausted oxygen, then put into water bath at 25° C. to react for 4 hours. The VAc conversion rate was found to be 87.75%. The emulsion is demulsified by ethanol and the precipitate was dried after three times of washing, then dried after three times purification to obtain polymer. The changes of molecular weight and its distribution of the polymers were analyzed using triple detection size exclusion chromatography. The results are obtained: light scattering weight-average molecular weight Mw.MALLS=2352000 g/mol, molecular weight distribution PDI=2.97.

The application therefore discloses a process for preparing an ultra-high molecular weight polymer via emulsion polymerization at the room/indoor temperature, belonging to the fields of polymer synthesis. Persulfate as initiator, water as medium, anionic surfactant as emulsifier, sodium bicarbonate as pH regulator, styrene, (meth) acrylate or vinyl acetate as monomer, is subjected to a free radical polymerization at room temperature and the normal pressure. The ultra-high molecular weight polymers were successfully obtained, whose weight average molecular weights of the polymers were larger than 1,000,000 g/mol. The monomer conversion can be above 85% after the reaction proceeded for about 1~6 hours. The process for preparing an ultra-high molecular weight polymer is carried out under the conditions of conventional free radical emulsion polymerization at the room temperature and normal pressure without the addition of other assist initiators. There is no need to control temperature and pressure of the reaction, low energy consumption, short reaction time and high monomer conversion, ultra-high molecular weight and narrow molecular weight distribution of the polymers can be achieved, and the molecular weight and molecular weight distribution can be adjusted and controlled in a wider range. The polymerization is simple and stable, the commercial materials can be directly used in the reaction, which greatly reduce the cost, easy operation, mild conditions and it is an environmentally friendly process. This process is highly suitable for synthesizing ultra-high molecular weight polymers from various monomers. These advantages of this process are of great significance for the research and application of ultra-high molecular weight polymers.

What is claimed is:

1. A process for preparing an ultra-high molecular weight polymer via emulsion polymerization at room temperature comprising potassium persulfate or ammonium persulfate as an initiator, water as a medium, an anionic surfactant as an emulsifier, sodium bicarbonate as a pH regulator, vinyl acetate or (meth) acrylate as a monomer to polymerize by free radical emulsion; to obtain the ultra-high molecular weight polymer wherein a weight average molecular weight of the ultra-high molecular weight polymer is larger than 1,000,000 g/mol;

a molar ratio of the initiator and the monomer is 1-5:100;
wherein the anionic surfactant is sodium dodecyl benzene sulfonate or sodium dodecyl sulfate;
wherein a mass ratio of the water and the monomer is 2-5:1;
wherein the mass ratio of the anionic surfactant and the monomer is 4-6:100 and the mass ratio of the sodium bicarbonate as the pH regulator and the monomer is 2-4:100;
wherein a pH value is adjusted to 7-8 for stability of the process;
wherein the room temperature is between 25° and 35° C.; and
wherein a polymerization reaction time is controlled to a range of 1-6 hours.

2. The process for preparing the ultra-high molecular weight polymer via emulsion polymerization at room temperature as described in claim 1, wherein the process occurs at an uncontrolled polymerization temperature.

3. The process for preparing the ultra-high molecular weight polymer via emulsion polymerization at room temperature as described in claim 1, wherein the anionic surfactant is sodium dodecyl sulfate.

* * * * *